United States Patent
Chung

(10) Patent No.: US 8,264,753 B2
(45) Date of Patent: Sep. 11, 2012

(54) AUTOMATIC DOCUMENT FEEDER, IMAGE READING DEVICE HAVING THE SAME AND IMAGE FORMING APPARATUS HAVING THE SAME

(75) Inventor: Jin Min Chung, Yongin-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 550 days.

(21) Appl. No.: 12/494,590

(22) Filed: Jun. 30, 2009

(65) Prior Publication Data

US 2010/0097668 A1    Apr. 22, 2010

(30) Foreign Application Priority Data

Oct. 16, 2008   (KR) .................. 10-2008-0101432

(51) Int. Cl.
*H04N 1/04* (2006.01)

(52) U.S. Cl. ........ 358/498; 358/474; 358/496; 399/367; 271/278; 271/279

(58) Field of Classification Search .................. 358/474, 358/498, 497, 496; 399/16, 364, 367, 374; 271/3.14, 114, 278, 279, 207, 264
See application file for complete search history.

(56) References Cited

U.S. PATENT DOCUMENTS

| | | | | |
|---|---|---|---|---|
| 5,506,658 A * | 4/1996 | Takemura et al. | ............... | 399/21 |
| 6,167,232 A * | 12/2000 | Jimenez et al. | ............... | 399/367 |
| 7,862,022 B2 * | 1/2011 | Kitahara | .................... | 270/58.08 |
| 7,924,475 B2 * | 4/2011 | Suzuki | .......................... | 358/474 |
| 7,959,147 B2 * | 6/2011 | Izuchi et al. | .................. | 271/9.02 |
| 8,020,857 B2 * | 9/2011 | Terao et al. | .................... | 271/220 |
| 8,091,886 B2 * | 1/2012 | Kato et al. | ..................... | 271/227 |
| 8,113,513 B2 * | 2/2012 | Funada | .......................... | 271/250 |
| 8,125,655 B2 * | 2/2012 | Katsuyama | ................. | 358/1.12 |
| 2003/0038992 A1 * | 2/2003 | Emmenegger et al. | ........ | 358/498 |
| 2005/0158091 A1 * | 7/2005 | Oya et al. | ...................... | 399/367 |
| 2006/0227390 A1 * | 10/2006 | Mochimaru et al. | .......... | 358/498 |
| 2007/0003344 A1 * | 1/2007 | Lee et al. | ...................... | 399/374 |
| 2008/0159793 A1 * | 7/2008 | Park | .............................. | 399/374 |
| 2008/0265489 A1 * | 10/2008 | Ng et al. | ........................ | 271/114 |
| 2009/0027743 A1 * | 1/2009 | Han | ................................ | 358/498 |
| 2009/0027744 A1 * | 1/2009 | Kim | ............................... | 358/498 |

FOREIGN PATENT DOCUMENTS

KR    2008-35175    4/2008

* cited by examiner

*Primary Examiner* — Negussie Worku
(74) *Attorney, Agent, or Firm* — Stanzione & Kim, LLP

(57) ABSTRACT

Disclosed are an automatic document feeder capable of moving a pickup device between a standby position and a pickup position and carrying out a document pickup operation by using a single driving source, an image reading device having the same and an image forming apparatus having the same. The automatic document feeder includes a pickup device, a lifting device and a pickup driving device. The pickup device includes a pickup roller to pick up a document sheet. The lifting device moves the pickup device between a standby position and a pickup position. The pickup driving device includes a pickup motor to rotate in a first direction and a second direction. The pickup motor drives the pickup roller by rotating in the first direction, and drives the lifting device by rotating in the second direction.

27 Claims, 6 Drawing Sheets

AUTOMATIC DOCUMENT FEEDER, IMAGE READING DEVICE HAVING THE SAME AND IMAGE FORMING APPARATUS HAVING THE SAME

CROSS-REFERENCE TO RELATED APPLICATIONS

This application claims the benefit of priority under 35 U.S.C. §119(a) from Korean Patent Application No. 2008-0101432, filed on Oct. 16, 2008 in the Korean Intellectual Property Office, the disclosure of which is incorporated herein by reference in its entirety.

BACKGROUND

1. Field of the Invention

The present general inventive concept relates to an automatic document feeder, and, more particularly, to an automatic document feeder with an improved driving structure of a pickup device, an image reading device having the same and an image forming apparatus having the same.

2. Description of the Related Art

Generally, an image reading device is a device that reads image information recorded on a document. Such an image reading device is mounted in an image forming apparatus, such as a fax machine, a digital copying machine, a multi-function printer, and the like.

An image reading device may include an automatic document feeder which automatically feeds document sheets so as to successively read the document sheets. An automatic document feeder includes a pickup device to pick up document sheets loaded on a document supply tray and feed them to a pickup device. The document sheet picked up by the pickup device is supplied to a reading unit, such as an image sensor, and image information on the document sheet is read by the reading unit.

When a user puts document sheets on a document supply tray, the pickup device is in an ascended state so as not to interfere with the document sheets. When picking up the document sheets, the pickup device is descended to the document sheets loaded on the document supply tray. In a descended state, the pickup device is in contact with a document sheet, and carries out a pickup operation.

SUMMARY

The present general inventive concept provides an automatic document feeder capable of lifting a pickup device up and down and carrying out a document pickup operation by using a single driving source, an image reading device having the same and an image forming apparatus having the same.

Additional features and utilities of the present general inventive concept will be set forth in part in the description which follows and, in part, will be obvious from the description, or may be learned by practice of the general inventive concept.

Embodiments of the present general inventive concept can be achieved by providing an automatic document feeder including a pickup device including a pickup roller to pick up a document sheet, a lifting device to move the pickup device between a standby position and a pickup position, and a pickup driving device including a pickup motor to drive the pickup roller by rotating in a first direction and to drive the lifting device by rotating in a second direction.

The pickup device may further include a rotating shaft, and a supporting member rotatably mounted on the rotating shaft, the supporting member supporting the pickup roller. The lifting device may include a lifting lever to lift the supporting member.

The automatic document feeder may further include an elastic member to elastically bias the pickup device in a direction of moving the pickup device towards the pickup position.

The pickup driving device may further include a cam to drive the lifting lever by being rotated by the pickup motor.

The lifting device may further include a lever rotating shaft, and lifting lever may include a shaft coupling part rotatably coupled to the lever rotating shaft, an interference arm extending from the shaft coupling part to interfere with the cam, and an operating arm extending from the shaft coupling part and including a supporting pole to support the supporting member.

The automatic document feeder may further include a sensing device to control a position of the cam.

The sensing device may include a sensing member to rotate together with the cam, and an optical sensor to sense the sensing member.

The pickup driving device may further include a first one-way clutch gear to selectively transmit power from the pickup motor to the lifting device.

The pickup driving device may further include a second one-way clutch gear to selectively transmit power from the pickup motor to the pickup roller.

Embodiments of the present can also be achieved by providing an automatic document feeder including a pickup roller to pick up a document sheet, a supporting member to support the pickup roller, a rotating shaft to rotatably support the supporting member, a lifting lever to lift the pickup roller by rotating the supporting member, a pickup motor to drive the pickup roller and the lifting lever, a first power transmission path to transmit power from the pickup motor to the pickup roller, and a second power transmission path branched from the first power transmission path to receive power from the first power transmission path and to transmit power from the pickup motor to the lifting lever.

The pickup motor may drive the pickup roller by rotating in a first direction, and may drive the lifting lever by rotating in a second direction.

The automatic document feeder may further include a cam disposed in the second power transmission path to rotate the lifting lever.

The automatic document feeder may further include a first one-way clutch gear disposed between the first power transmission path and the second power transmission path, the first one-way clutch gear to intermit power transmitted to the second power transmission path.

The automatic document feeder may further include a second one-way clutch gear disposed in the first power transmission path to intermit power transmitted to the pickup roller.

Embodiments of the present invention can also be achieved by providing an image reading device including, a reading device body including a document supply tray and a document feeding path, a reading unit to read image information from a document sheet in the document feeding path, a pickup device including a pickup roller to pick up a document sheet from the document supply tray and feed the document sheet to the document feeding path, a lifting device to move the pickup device between a standby position and a pickup position, a pickup motor capable of being driven in clockwise and counterclockwise directions and to drive the pickup roller and the lifting device, a first power transmission unit to transmit power from the pickup motor to the pickup roller, and a second power transmission unit to transmit power from the pickup motor to the lifting device.

The pickup device may further include a supporting member to support the pickup roller, and the supporting member may include a first portion rotatably supported on a rotating shaft, and the lifting device may include a lifting lever to lift the pickup roller by rotating a second portion of the supporting member.

The lifting lever may include a supporting pole protruding to an area below the supporting member, the supporting pole supporting the supporting member.

The first power transmission unit may include a driving shaft to be rotated by the pickup motor, and a first one-way clutch gear mounted on the driving shaft, the first one-way clutch gear to intermit power transmitted to the second power transmission unit.

The first power transmission unit may include a second one-way clutch gear mounted on the rotating shaft, the second one-way clutch gear to intermit power transmitted to the pickup roller.

The second power transmission unit may include a cam to be rotated by power transmitted through the first one-way clutch gear, the cam to drive the lifting lever.

The image reading device may further include a supporting arm rotatably mounted to the driving shaft, and a guide arm including a first portion rotatably coupled to the supporting arm and a second portion coupled to the lifting lever to guide the lifting lever.

Embodiments of the present invention can also be achieved by providing an image forming apparatus including an image reading device including a reading unit to read image information from a document sheet and an automatic document feeder to pick up a document sheet and feed the document sheet to the reading unit and a printing device to print an image on a printing medium. The automatic document feeder may include a pickup device including a rotating shaft, a supporting member rotatably mounted on the rotating shaft, and a pickup roller supported by the supporting member, a lifting lever to move the supporting member between a standby position and a pickup position, and a pickup motor to drive the pickup roller by rotating in a first direction and to drive the lifting lever by rotating in a second direction.

The automatic document feeder may further include an elastic member to elastically bias the supporting member in a direction of moving the supporting member towards the pickup position.

The automatic document feeder may further include a cam to be rotated by power transmitted from the pickup motor, the cam to rotate the lifting lever by interfering with a portion of the lifting lever.

Embodiments of the present general inventive concept can also be achieved by providing an image reading device including a reading unit to read information of a document sheet, a pickup device including a pickup roller to feed the document sheet to the reading unit when the pickup device is in a pickup position, a lifting device to move the pickup device between the pickup position and a standby position, and a pickup driving device to drive the pickup roller by rotating in a first direction and to drive the lifting device by rotating in a second direction.

Embodiments of the present general inventive concept can also be achieved by providing an image forming apparatus including an image reading device and a printing device to print an image on a printing medium. The image reading device includes a reading unit to read information of a document sheet, a pickup device including a pickup roller to feed the document sheet to the reading unit when the pickup device is in a pickup position, a lifting device to move the pickup device between the pickup position and a standby position, and a pickup driving device to drive the pickup roller by rotating in a first direction and to drive the lifting device by rotating in a second direction.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings, of which.

DETAILED DESCRIPTION OF THE EMBODIMENTS

Figure 1:
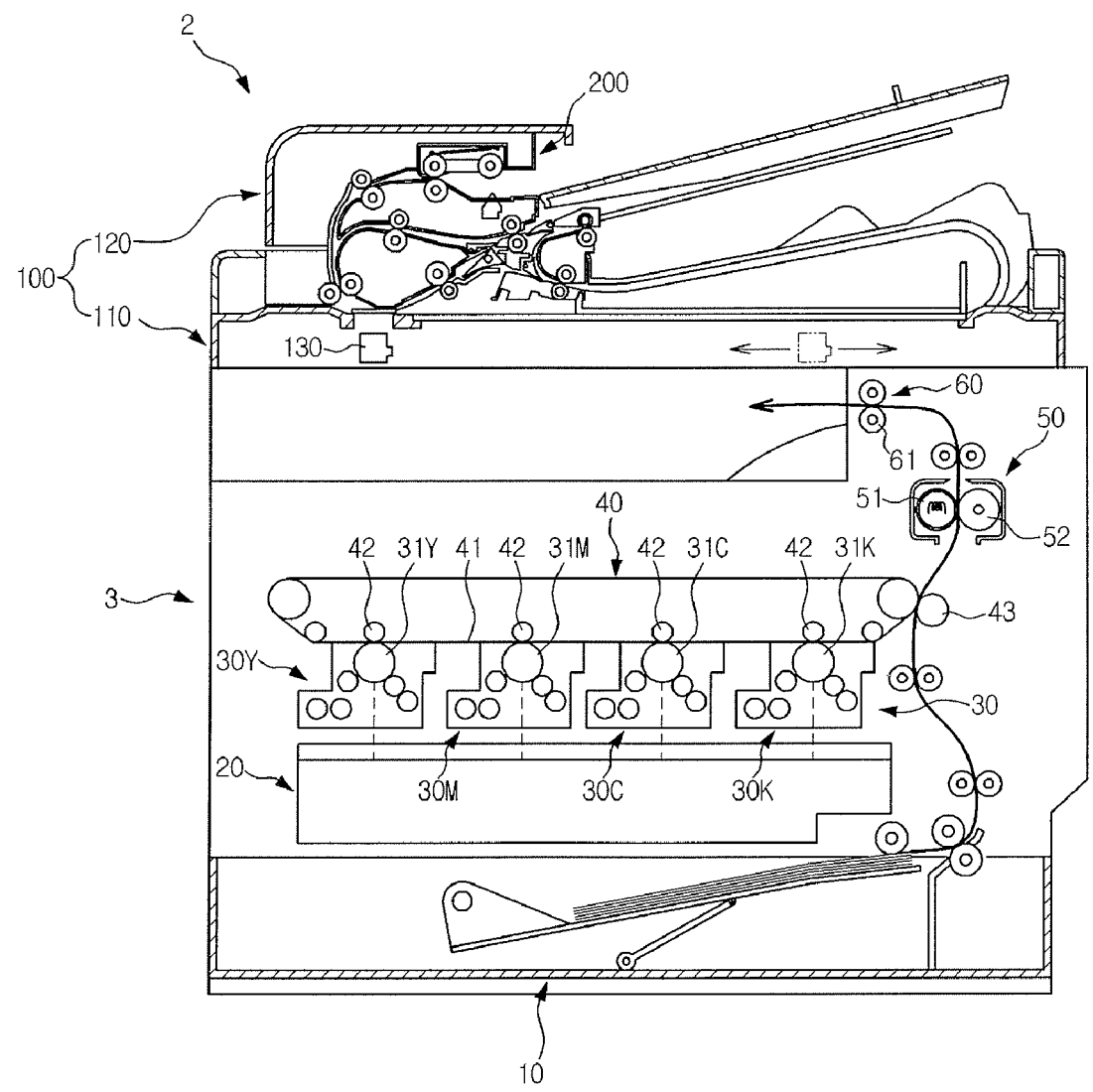
FIG. 1 is a view illustrating an image forming apparatus according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below to explain the present general inventive concept by referring to the figures.

Figure 2:
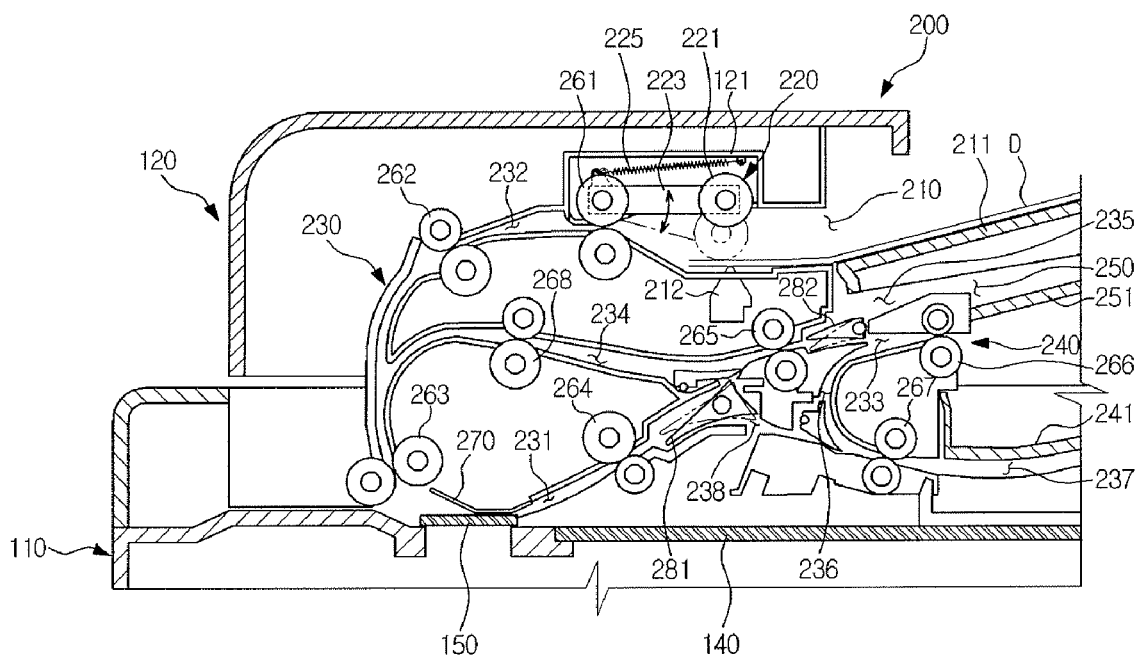
FIG. 2 is a view illustrating an image reading device according to an exemplary embodiment of the present general inventive concept.

FIG. 1 is a view illustrating an image forming apparatus according to an exemplary embodiment of the present general inventive concept, and FIG. 2 is a view illustrating an image reading device according to an exemplary embodiment of the present general inventive concept.

As illustrated in FIG. 1, an image forming apparatus 1 comprises an image reading device 2 that reads image information recorded on a document, and a printing device 3 that prints images on printing media, e.g., paper.

The printing device 3 serves to print an image in response to a signal from the image reading device 2 or a signal from an external apparatus such as a PC, etc. The printing device 3 includes a printing media supply unit 10, a laser scanning unit 20, a developing unit 30, a transfer unit 40, a fusing unit 50 and a printing media discharge unit 60.

The laser scanning unit 20 serves to radiate light corresponding to image information to photosensitive bodies 31, to form electrostatic latent images on surfaces of the photosensitive bodies 31.

The developing unit 30 serves to supply developers to the electrostatic latent images formed on the photosensitive bodies 31, to each form a portion of a visible image. The developing unit 30 may include four developing devices 30K, 30C, 30M and 30Y, in which developers of different colors from each other, e.g., black (K), cyan (C), magenta (M) and yellow (Y), are respectively stored. The developing unit may include four photosensitive bodies 31K, 31C, 31M, and 31Y each to receive a developer from corresponding developing devices 30K, 30C, 30M, and 30Y. For example, the photosensitive body 31K corresponds to developing device 30K which stores a black developer. The developing unit 30 may include any number of developing devices to correspond to any number of photosensitive bodies 31.

The transfer unit 40 may include an intermediate transfer belt 41, first transfer rollers 42 and a second transfer roller 43. The portions of the visible image formed on the photosensitive bodies 31K, 31C, 31M and 31Y are transferred onto the intermediate transfer belt 41 by the first transfer rollers 42 to form an image on the intermediate transfer belt 41. The image on the intermediate transfer belt 41 is transferred onto a printing medium which is supplied from the printing media supply unit 10 and passes between the second transfer roller 43 and the intermediate transfer belt 41.

The printing medium passing through the transfer unit 40 proceeds to the fusing unit 50. The fusing unit 50 may include a heating roller 51 and a press roller 52. The printing medium with an image transferred thereon passes between the heating roller 51 and the press roller 52, and the image is fused to the printing medium by heat and pressure.

The printing medium passing through the fusing unit 50 is guided to the printing media discharge unit 60, and is discharged outside the printing device 3 by a discharge roller 61.

As illustrated in FIGS. 1 and 2, the image reading device 2 includes a reading device body 100 having a reading frame 110 and a cover 120. The cover 120 is hingedly coupled to the reading frame 110 to open and close the top surface of the reading frame 110.

A reading unit 130 is mounted inside the reading frame 110, to read information recorded on a document. An automatic document feeder 200 is provided at the cover 120, to automatically feed pages of a document, also referred to as "sheets" or "document sheets," so as to achieve successive scanning.

A first glass 140 and a second glass 150 are provided on the top of the reading frame 110. The first glass 140 is used to read document sheets placed on the first glass 140 by a user, and the second glass 150 is used to read document sheets fed by the automatic document feeder 200. The document is read page by page, or sheet by sheet, at the first glass 140 or the second glass 150. The reading unit 130 is disposed below the first glass 140 and the second glass 150, and serves to read image information recorded on the document sheet put on the first glass 140 or the document sheet fed by the automatic document feeder 200.

The reading unit 130 irradiates light towards the document sheet, and detects the light reflected from the document sheet. By converting the light intensity into an electric signal, the reading unit 130 reads image information from the document sheet. The reading unit 130 may be configured as a contact image sensor (CIS) or a charge coupled device (CCD).

The automatic document feeder 200 includes a document inlet port 210 to receive the document sheet to be read therethrough, a pickup device 220 to pick up and feed the document sheet inputted through the document inlet port 210, a document feeding path 230 formed in the cover 120, to feed the document sheet therethrough, a first document outlet port 240 to discharge the read document sheet therethrough, and a second document outlet port 250 to discharge a portion of the document sheet, whose first side has been read in a double-sided reading process, therethrough.

The automatic document reader may include a document supply tray 211 provided near the document inlet port 210 to load the document sheet D to be fed by the automatic document feeder 200. A document discharge tray 241 may be provided near the first document outlet port 240 to receive the read document sheet discharged through the first document outlet port 240. A document support tray 251 may be mounted between the document supply tray 211 and the document discharge tray 241, to guide the document sheet discharged through the second document outlet port 250. The document support tray 251 supports the document sheet to prevent a portion of the document sheet from moving towards the document discharge tray 241 when the document sheet is discharged outside the cover 120 before being fed reversely in a first reverse path 235 to be described in more detail later.

The document feeding path 230 includes a reading path 231 in which the reading process is performed by the reading unit 130, a supply path 232 having a first end communicating with the document inlet port 210 and a second end communicating with a first end of the reading path 231, and a discharge path 233 having a first end communicating with a second end of the reading path 231 and a second end communicating with the first document outlet port 240.

A pickup roller 221, a feed roller 261 and a register roller 262 are disposed in the supply path 232. The pickup roller 221 picks up the document sheet loaded on the document supply tray 211. The feed roller 261 feeds the document sheet picked up by the pickup roller 221. The register roller 262 aligns a leading edge of the document sheet and then feeds the document sheet along document feeding path 230 towards the second glass 150.

The second glass 150 is disposed on the reading path 231 so that the reading unit 130 can read image information recorded on a document sheet as it passes through the reading path 231. A white bar 270 is mounted above the second glass 150 to press the document sheet to closely contact the second glass 150. A first reading roller 263 is disposed upstream of the second glass 150 in the reading path 231, to feed the document sheet entering the reading path 231 to the second glass 150 so that the reading unit 130 can read information recorded on the document sheet. A second reading roller 264 is disposed downstream of the second glass 150, to feed the document sheet from the second glass 150.

The document feeding path 230 includes a double-sided document circulation path 234 connecting the second end of the reading path 231 and the first end of the reading path 231, a first reverse path 235 having a first end communicating with the double-sided document circulation path 234 and a second end communicating with the second document outlet port 250, a double-sided document feeding path 238 having a first end communicating with the reading path 231 and a second end communicating with a guide path 237, and a second reverse path 236 connecting the double-sided document feeding path 238 and the discharge path.

A first reverse roller 265 is disposed upstream of the discharge path 233 and the first reverse path 235. A discharge roller 266 is disposed in the discharge path 233. A second reverse roller 267 is disposed in the second end of the double-sided document feeding path 238.

A first path switching unit 281 is disposed downstream of the second reading roller 264 and upstream of the double-sided document feeding path 238, and a second path switching unit 282 is disposed downstream of the first reverse roller 265 and upstream of the discharge path 233 and the first reverse path 235. The first path switching unit 281 pivots between a first position (illustrated by solid lines in FIG. 2) to guide the document sheet passing through the reading path 231 to the first reverse roller 265 and a second position (illustrated by dotted lines in FIG. 2) to guide the document sheet passing through the reading path 231 to the double-sided document feeding path 238. The second path switching unit 282 pivots between a first position (illustrated by solid lines in FIG. 2) to guide the document sheet passing by the first reverse roller 265 to the discharge path 233 and a second position (illustrated by dotted lines in FIG. 2) to guide the document sheet passing by the first reverse roller 265 to the first reverse path 235.

The automatic document feeder 200 may perform a single-sided reading process or a double-sided reading process. In the single-sided reading process, a first side of a document sheet is read by the reading unit 130 and then the document sheet is discharged from the automatic document feeder 200. In the double-sided reading process, a first side of a document sheet is read by the reading unit 130, then a second side of the document sheet is read by the reading unit 130, and then the document sheet is discharged from the automatic document feeder 200.

In the single-sided reading process, image information on a first side of a document sheet is read by the reading unit 130 in the reading path 231, and is guided to the first reverse roller 265 by the first path switching unit 281 in the first position. Then, the document sheet is guided to the discharge path 233 by the second path switching unit 282 in the first position, and is discharged to the document discharge tray 241 by the discharge roller 266.

In the double-sided reading process, image information on a first side of a document sheet is read by the reading unit 130 in the reading path 231, and is guided to the first reverse roller 265 by the first path switching unit 281 in the first position. Then, the document sheet is guided to the first reverse path 235 by the second path switching unit 282 in the second position. The first reverse roller 265 feeds the document sheet into the first reverse path 235 in a direction of discharging the document sheet to the second document outlet port 250. The first reverse roller 265 reverses direction at a predetermined point, before the document sheet is completely discharged, so as to feed the document sheet to the double-sided document circulation path 234. The document sheet is then fed into the double-sided document circulation path 234 by a circulation roller 268 and enters the reading path 231 in such a way that the image information on a second side of the document sheet is read by the reading unit 130. After the image information on both the first and second sides are read, the document sheet is guided to the double-sided document feeding path 238 by the first path switching unit 281 in the second position. The second reverse roller 267 feeds the document sheet from the double-sided document feeding path 238 to the guide path 237, and reverses direction at a predetermined point, before the document sheet is completely discharged, so as to feed the document sheet to the second reverse path 236. The document sheet then passes through the second reverse path 236, is guided to the discharge path 233, and is discharged to the document discharge tray 241 by the discharge roller 266.

In an exemplary embodiment of the present general inventive concept, the rotating operation of the pickup roller 221 and the lifting operation of the pickup device 220 are achieved by a single driving source. Accordingly, the number of components is reduced, and thus manufacturing costs are reduced as well. Additionally, the driving structure of the pickup device 220 is simplified.

Figure 3:
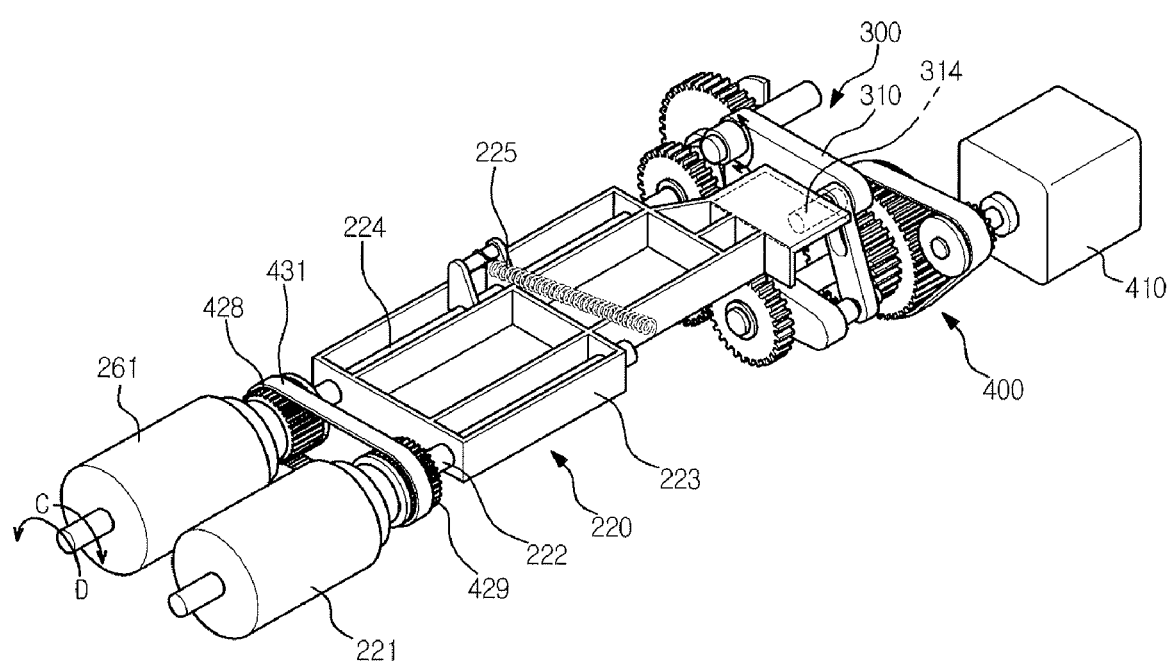
FIG. 3 is a perspective view illustrating a pickup device, a lifting device and a pickup driving device of an automatic document feeder according to an exemplary embodiment of the present general inventive concept.
Figure 4:
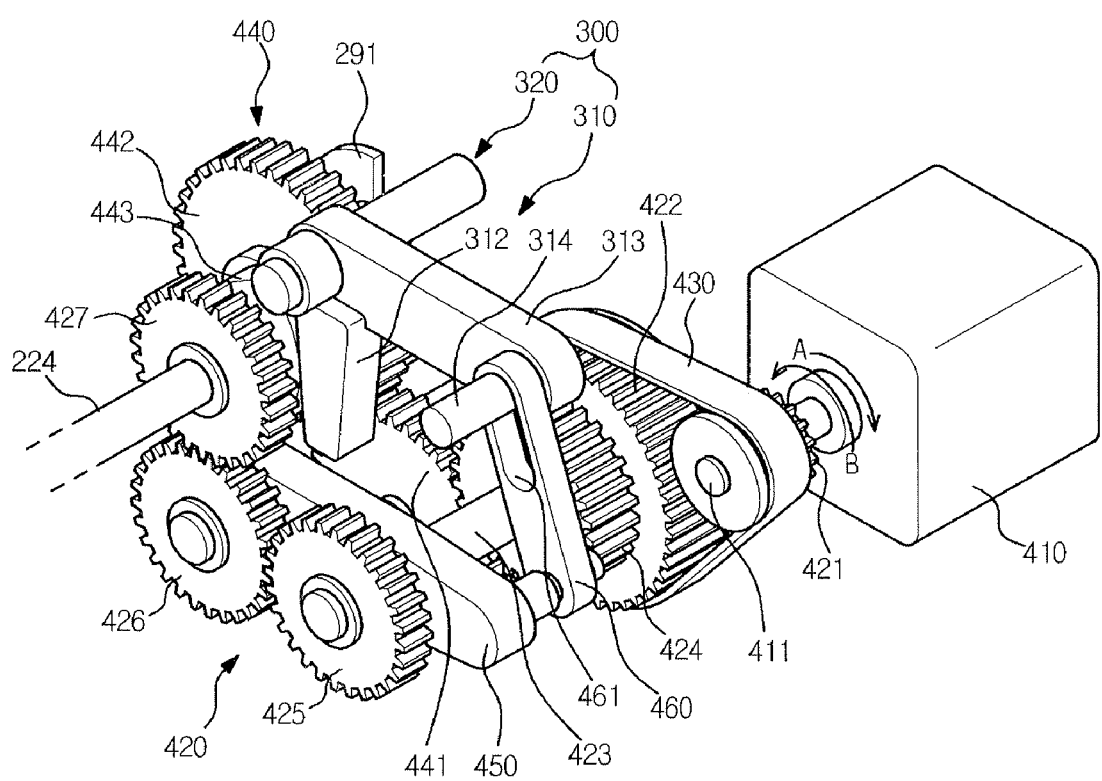
FIGS. 4 to 6 are perspective views partially illustrating an automatic document feeder according to an exemplary embodiment of the present general inventive concept.
Figure 5:
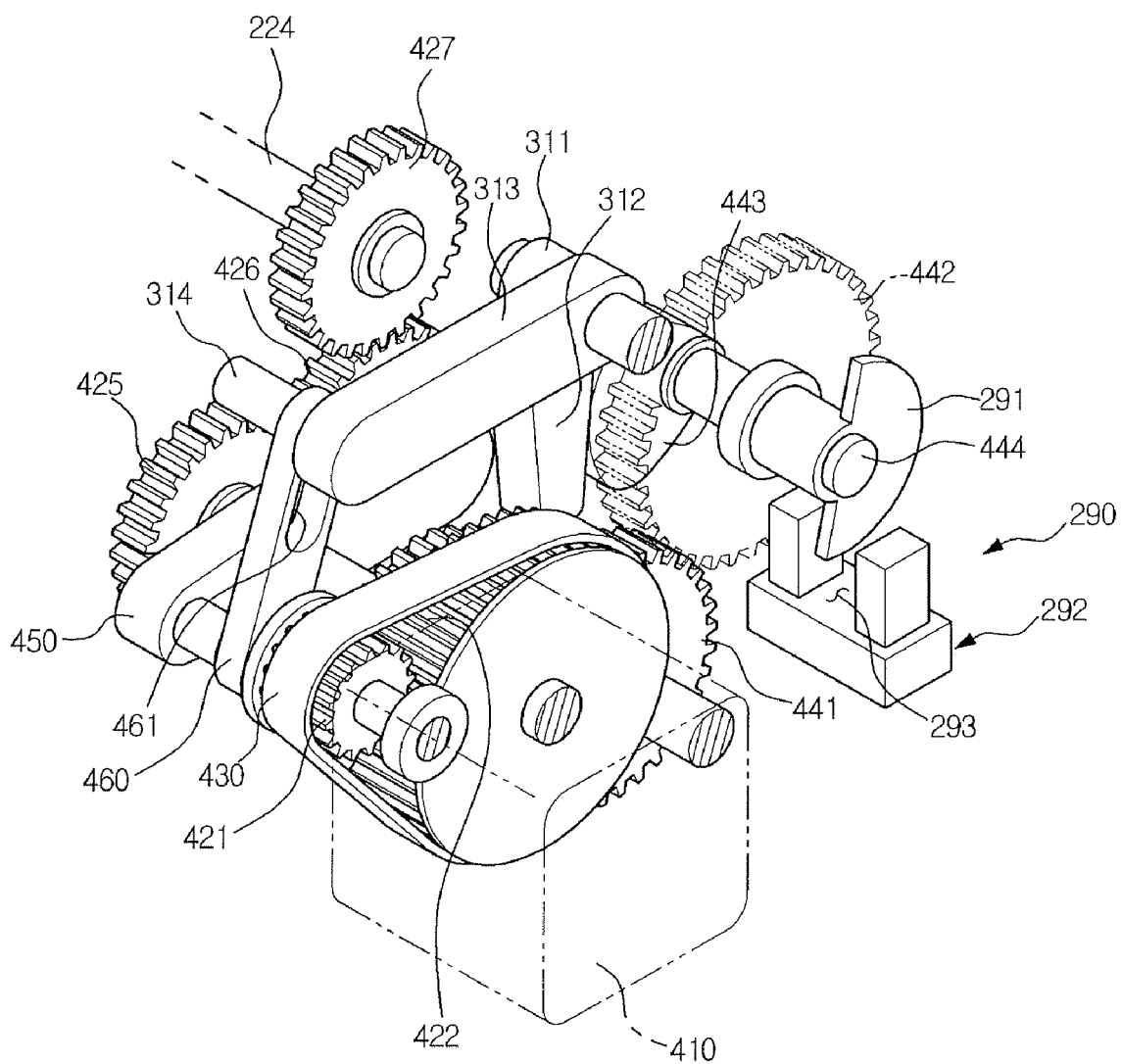
Figure 6:
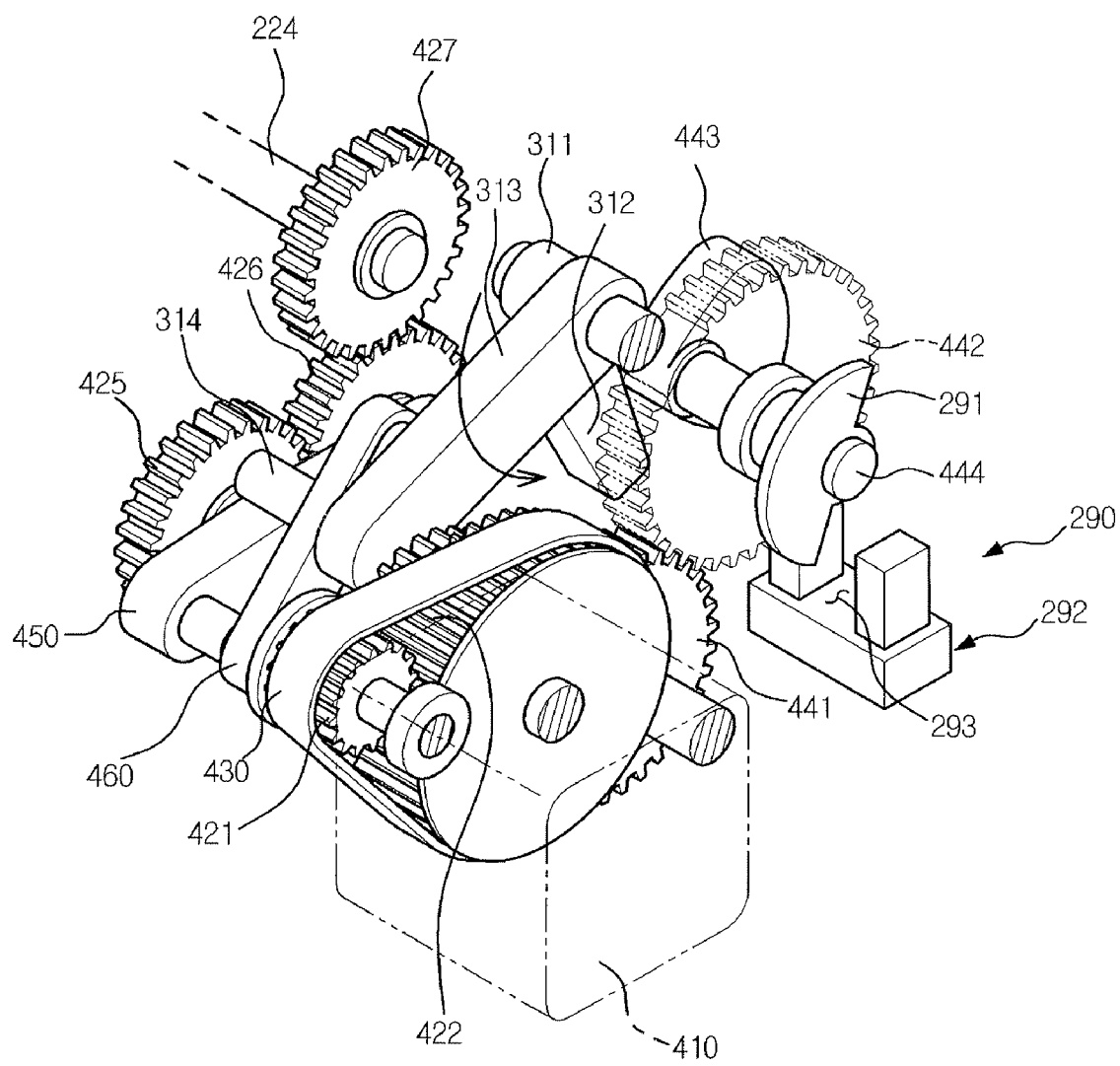

FIG. 3 is a perspective view illustrating the pickup device 220, a lifting device 300 and a pickup driving device 400 of the automatic document feeder 200 according to an exemplary embodiment of the present general inventive concept. FIGS. 4 to 6 are perspective views partially illustrating the automatic document feeder 200 illustrated in FIG. 3. FIG. 5 is a view illustrating a state in which the pickup device 220 is lifted to a standby position by the lifting device 300, and FIG. 6 is a view illustrating a state in which the pickup device 220 is pivoted downwards to a pickup position by the lifting device 300.

As illustrated in FIGS. 2 and 3, the automatic document feeder 200 includes a lifting device 300 to lift the pickup device 220, and a pickup driving device 400 to drive the pickup roller 221 and the lifting device 300.

The pickup device 220 is disposed above the document inlet port 210. The pickup device 220 includes the pickup roller 221, a pickup roller shaft 222 and a supporting member 223. The pickup roller 221 is mounted to the pickup roller shaft 222, and the pickup roller shaft 222 is rotatably supported by a first portion of the supporting member 223.

A second portion of the supporting member 223 is rotatably supported by a rotating shaft 224. When the second portion supporting member 223 rotates with respect to the rotating shaft 224, the first portion of the supporting member 223 moves the pickup roller 221 up and down.

The supporting member 223 is disposed below an upper frame 121 of the cover 120. An elastic member 225 is mounted between the supporting member 223 and the upper frame 121. The elastic member 225 elastically biases the supporting member 223 so that the supporting member 223 can be maintained in a downwardly rotated state. Therefore, when external force is not applied to the supporting member 223, the pickup roller 221 is in a downwardly moved state. In other words, when the pickup device 220 is not lifted by the lifting device 300, the pickup device 220 maintains the pickup position.

The lifting device 300 may include a lifting lever 310 to support the supporting member 223. The lifting lever 310 may support the supporting member at a third portion of the supporting member. When the lifting lever 310 pivots upwards due to the power transmitted from the pickup driving device 400, the supporting member 223 pivots upwards, and accordingly the pickup roller 221 is moved to the standby position.

As illustrated in FIGS. 3 and 4, the pickup driving device 400 includes a pickup motor 410 which can be driven in both clockwise and counterclockwise directions, a first power transmission unit 420 to transmit the power from the pickup motor 410 to the pickup roller 221, and a second power transmission unit 440 to transmit the power from the pickup motor 410 to the lifting lever 310.

The first power transmission unit 420 includes a first gear 421, a second gear 422, a driving shaft 423, a first one-way clutch gear 424, a third gear 425, a fourth gear 426, a fifth gear 427, a second one-way clutch gear 428 and a pickup roller gear 429. The first power transmission unit 420 defines a power transmission path from the pickup motor 410 to the pickup roller 221. In other words, the first power transmission unit 420 transmits power supplied from the pickup motor 410 to the pickup roller 221 in order for the pickup roller 221 to pick up a document sheet that has been loaded on the document supply tray 211.

The first gear 421 is mounted to a pickup motor shaft 411, and is connected to the second gear 422 through a driving belt 430. The second gear 422, the first one-way clutch gear 424 and the third gear 425 are disposed on the driving shaft 423. When the second gear 422 rotates, the driving shaft 423 rotates, and accordingly the third gear 425 also rotates. The first one-way clutch gear 424 selectively transmits the power from the pickup motor 410 to the lifting device 300. When the pickup motor 410 rotates in a first direction (A direction), the first one-way clutch gear 424 does not rotate together with the driving shaft 423. When the pickup motor 410 rotates in a second direction (B direction), the first one-way clutch gear 424 rotates together with the driving shaft 423, so as to transmit the power from the pickup motor 410 to the second power transmission unit 440.

A supporting arm 450 is mounted on the driving shaft 423. The supporting arm 450 does not rotate together with the driving shaft 423, but is mounted to the driving shaft 423 in such a way that allows just the driving shaft 423 to rotate. The fourth gear 426 is rotatably mounted to a portion of the supporting arm 450, and is engaged with the third gear 425.

The fifth gear 427 is mounted to a first portion of the rotating shaft 224, and is engaged with the fourth gear 426. The second one-way clutch gear 428 is mounted to a second portion of the rotating shaft 224. The second one-way clutch gear 428 is connected to the pickup roller gear 429 mounted to the pickup roller shaft 222, via a power transmission belt 431.

The second one-way clutch gear 428 intermits the power transmitted to the pickup roller 221 according to the rotational direction of the rotating shaft 224. When the rotating shaft 224 rotates in a first direction (C direction), the second one-way clutch gear 428 rotates together with the rotating shaft 224, to transmit the power to the pickup roller gear 429. When the rotating shaft 224 rotates in a second direction (D direction), the second one-way clutch gear 428 does not rotate together with the rotating shaft 224.

As illustrated in FIG. 3, the feed roller 261 may be mounted on the rotating shaft 224.

As illustrated in FIGS. 3 to 6, the second power transmission unit 440 includes a sixth gear 441, a seventh gear 442 and a cam 443, and defines a power transmission path from the pickup motor 410 to the lifting lever 310.

The sixth gear 441 is engaged with the first one-way clutch gear 424, and the seventh gear 442 is engaged with the sixth gear 441. The seventh gear 442 and the cam 443 are disposed on a cam shaft 444. When the power is transmitted through the first one-way clutch gear 424, the sixth gear 441 transmits the power to the seventh gear 442, and the seventh gear 442 rotates on the cam shaft 444. The cam 443 is connected to the seventh gear 442, to rotate together with the seventh gear 442.

The lifting device 300 includes a lever rotating shaft 320 to rotatably support the lifting lever 310. The lifting lever 310 includes a shaft coupling part 311 coupled to the lever rotating shaft 320, an interference arm 312 extending from the shaft coupling part 311 to interfere with the cam 443, and an operating arm 313 extending from the shaft coupling part 311 and having a supporting pole 314 to support the supporting member 223.

As illustrated in FIG. 5, when the cam 443 is positioned so as to contact or interfere with the interference arm 312 of the lifting lever 310, the cam 443 rotates towards the interference arm and the lifting lever 310 rotates with respect to the lever rotating shaft 320. The cam 443 pushes the operating arm 313 upwards, which causes the supporting pole 314 to move upwards as well. This movement corresponds to a movement of the pickup device 220 from the pickup position to the standby position. Therefore the pickup roller 221 mounted to the supporting member 223 is moved to the standby position. As illustrated in FIG. 6, when the cam 443 is placed at a position apart from the interference arm 312, the pickup roller 221 mounted to the supporting member 223 is maintained in a downwardly rotated state by an elastic force of the elastic member 225. In other words, when the cam 443 is not in contact with the interference arm 312, the pickup roller 221 is in the pickup position. When the cam 443 is in contact with the interference arm 312 and rotates away from the interference arm 312, the cam releases the operating arm 313 which causes the supporting pole 314 to move downwards. Accordingly, as the supporting pole 314 moves downwards, the pickup roller 221 moves from the standby position to the pickup position.

A guide arm 460 is disposed between the lifting lever 310 and the supporting arm 450, to guide the lifting lever 310. A first portion of the guide arm 460 is rotatably coupled to the supporting arm 450. A second portion of the guide arm 460 is formed with a slot 461. The supporting pole 314 of the operating arm 313 passes through the slot 461 of the second portion of guide arm 460, and extends to an area below the supporting member 223.

The automatic document feeder 200 further includes a sensing device 290 to control a position of the cam 443. The sensing device 290 includes a sensing member 291 rotatably mounted on the cam shaft 444 so as to rotate together with the seventh gear 442, and an optical sensor 292 to sense the sensing member 291.

When the cam 443 is placed in a position so as to contact or interfere with the interference arm 312, i.e., when the pickup roller 221 is in the standby position, the sensing member 291 is positioned to be sensed by the optical sensor 292 (refer to FIG. 5). When the cam 443 is placed in a position apart from the interference arm 312, i.e., when the pickup roller 221 is in the pickup position, the sensing member 291 is positioned to not be sensed by the optical sensor 292 (refer to FIG. 6).

As illustrated in FIGS. 2 to 5, in a standby mode of the image reading device 2, the cam 443 is placed in a position so as to contact or interfere with the interference arm 312 of the lifting lever 310. Accordingly, the pickup device 220, as illustrated by a solid line in FIG. 2, is maintained in an upwardly rotated state in the standby position. At this time, the sensing member 291 is positioned in a sensing area 293 of the optical sensor 292, and is sensed by the optical sensor 292. In such a state, if a document sheet is put into the document inlet port 210, the document sheet is sensed by a document sensor 212 (refer to FIG. 2) mounted in the document inlet port 210. Then a control unit (not illustrated) of the image reading device rotates the pickup motor 410 in the first direction (A direction).

When the pickup motor 410 rotates in the first direction, the rotational force of the pickup motor 410 is transmitted to the second gear 422 via the first gear 421 and the driving belt 430, and the driving shaft 423 rotates. When the pickup motor 410 rotates in the second direction, the first one-way clutch gear 424 rotates together with the driving shaft 423. When the first one-way clutch gear 424 rotates, the sixth gear 441, the seventh gear 442, the cam 443 and the sensing member 291 rotate. When the cam 443 rotates, the cam 443 in a state of contacting or interfering with the interference arm 312, as illustrated in FIG. 6, is separated from the interference arm 312 of the lifting lever 310. The supporting member 223 supported by the supporting pole 314 of the operating arm 313 pivots down by the elastic force of the elastic member 225, thus rotating the pickup roller 221 from the standby position to the pickup position. The pickup roller 221 then contacts the document sheet put into the document inlet port 210. As such, when the pickup roller 221 is in the pickup position, the sensing member 291 deviates from the sensing area 293 of the optical sensor 292, and is not sensed by the optical sensor 292. Then, the control unit (not illustrated) of the image reading device stops the rotation of the pickup motor 410, so that the pickup roller 221 can be maintained in the pickup position.

When the document sensor 212 (refer to FIG. 2) mounted in the document inlet port 210 does not detect a document sheet, the control unit (not illustrated) of the image reading device 2 rotates the pickup motor 410 in the second direction (B direction). When the pickup motor 410 rotates in the second direction, the rotational force of the pickup motor 410 is transmitted to the rotating shaft 224 via the driving shaft 423, the third gear 425, the fourth gear 426 and the fifth gear 427. However, because the second one-way clutch gear 428 does not rotate with the rotating shaft 224, the power is not transmitted to the pickup roller 221.

The document pickup operation is performed in a state such that the pickup roller 221 moves towards the pickup position. When the pickup roller 221 rotates to pick up the document sheet, the pickup motor 410 rotates in the first direction (A direction). The rotational force of the pickup motor 410 is transmitted to the second gear 422 via the first gear 421 and the driving belt 430, and accordingly the driving shaft 423 rotates. When the driving shaft 423 rotates, the third gear 425 coupled to the end portion of the driving shaft 423, the fourth gear 426 engaged with the third gear 425 and the fifth gear 427 engaged with the fourth gear 426 rotate. When the pickup motor 410 rotates in the first direction, the first one-way clutch gear 424 does not rotate with the driving shaft 423. Therefore, the power from the pickup motor 410 is not transmitted to the lifting lever 310 through the second power transmission unit 440.

When the fifth gear 427 rotates, the rotating shaft 224 rotates. At this time, the rotational force of the rotating shaft 224 is transmitted to the pickup roller gear 429 via the second one-way clutch gear 428 and the power transmission belt 431. Therefore, the pickup roller 221 rotates, and picks up the document sheet in the document inlet port 210. Also, as the rotating shaft 224 rotates, the feed roller 261 mounted on the rotating shaft 224 also rotates, and feeds the document sheet picked up by the pickup roller 221.

In order to lift up the pickup device 220, i.e., move the pickup device 220 to the standby position, the pickup motor 410 rotates in the second direction from the state illustrated in FIG. 6. The power from the pickup motor 410 is transmitted to the cam 443, and accordingly the cam 443 rotates. When the cam 443 rotates and contacts or interferes with the interference arm 312, the lifting lever 310 rotates, and the operating arm 313 of the lifting lever 310 moves up, thereby lifting up the supporting member 223, and moving the pickup roller 221 from the pickup position to the standby position.

As is apparent from the above description, the automatic document feeder, the image reading device having the same and the image forming apparatus having the same according to the present general inventive concept can reduce the number of driving sources to drive the pickup device. Accordingly, manufacturing cost comes down, and the driving structure of the pickup device is simplified.

Although a few exemplary embodiments of the present general inventive concept have been illustrated and described, it would be appreciated by those skilled in the art that changes may be made in these exemplary embodiments without departing from the principles and spirit of the general inventive concept, the scope of which is defined in the appended claims and their equivalents.

What is claimed is:

1. An automatic document feeder, comprising:
   a pickup device including a pickup roller to pick up a document sheet;
   a lifting device to move the pickup device between a standby position and a pickup position; and
   a pickup driving device including a pickup motor to drive the pickup roller by rotating in a first direction and to drive the lifting device by rotating in a second direction.

2. The automatic document feeder according to claim 1, wherein the pickup device further includes a rotating shaft, and a supporting member rotatably mounted on the rotating shaft, the supporting member supporting the pickup roller, and wherein the lifting device includes a lifting lever to lift the supporting member.

3. The automatic document feeder according to claim 1, further comprising:
   an elastic member to elastically bias the pickup device in a direction of moving the pickup device towards the pickup position.

4. The automatic document feeder according to claim 2, wherein the pickup driving device further includes a cam to drive the lifting lever by being rotated by the pickup motor.

5. The automatic document feeder according to claim 4, wherein the lifting device further includes a lever rotating shaft,
   and wherein the lifting lever includes a shaft coupling part rotatably coupled to the lever rotating shaft, an interference arm extending from the shaft coupling part to interfere with the cam, and an operating arm extending from the shaft coupling part and including a supporting pole to support the supporting member.

6. The automatic document feeder according to claim 4, further comprising:
   a sensing device to control a position of the cam.

7. The automatic document feeder according to claim 6, wherein the sensing device includes a sensing member to rotate together with the cam, and an optical sensor to sense the sensing member.

8. The automatic document feeder according to claim 1, wherein the pickup driving device further includes a first one-way clutch gear to selectively transmit power from the pickup motor to the lifting device.

9. The automatic document feeder according to claim 1, wherein the pickup driving device further includes a second one-way clutch gear to selectively transmit power from the pickup motor to the pickup roller.

10. The automatic document feeder according to claim 2, wherein the pickup driving device further includes a driving shaft to be rotated by the pickup motor, a supporting arm disposed on the driving shaft, and a guide arm disposed between the supporting arm and the lifting lever to guide the lifting lever.

11. An automatic document feeder, comprising:
    a pickup roller to pick up a document sheet;
    a supporting member to support the pickup roller;
    a rotating shaft to rotatably support the supporting member;
    a lifting lever to lift the pickup roller by rotating the supporting member;
    a pickup motor to drive the pickup roller and the lifting lever;
    a first power transmission path to transmit power from the pickup motor to the pickup roller; and
    a second power transmission path branched from the first power transmission path to receive power from the first power transmission path and to transmit power from the pickup motor to the lifting lever.

12. The automatic document feeder according to claim 11, wherein the pickup motor drives the pickup roller by rotating in a first direction, and drives the lifting lever by rotating in a second direction.

13. The automatic document feeder according to claim 11, further comprising:
    a cam disposed in the second power transmission path to rotate the lifting lever.

14. The automatic document feeder according to claim 11, further comprising:
    a first one-way clutch gear disposed between the first power transmission path and the second power transmission path, the first one-way clutch gear to intermit power transmitted to the second power transmission path.

15. The automatic document feeder according to claim 11, further comprising:
a second one-way clutch gear disposed in the first power transmission path to intermit power transmitted to the pickup roller.

16. An image reading device, comprising:
a reading device body including a document supply tray and a document feeding path;
a reading unit to read image information from a document sheet in the document feeding path;
a pickup device including a pickup roller to pick up a document sheet from the document supply tray and feed the document sheet to the document feeding path;
a lifting device to move the pickup device between a standby position and a pickup position;
a pickup motor configured to be driven in clockwise and counterclockwise directions to drive the pickup roller and the lifting device;
a first power transmission unit to transmit power from the pickup motor to the pickup roller; and
a second power transmission unit to transmit power from the pickup motor to the lifting device.

17. The image reading device according to claim 16, wherein the pickup device further includes a supporting member to support the pickup roller,
the supporting member includes a first portion rotatably supported on a rotating shaft, and
the lifting device includes a lifting lever to lift the pickup roller by rotating a second portion of the supporting member.

18. The image reading device according to claim 17, wherein the lifting lever includes a supporting pole protruding to an area below the supporting member, the supporting pole supporting the supporting member.

19. The image reading device according to claim 16, wherein the first power transmission unit includes a driving shaft to be rotated by the pickup motor, and a first one-way clutch gear mounted on the driving shaft, the first one-way clutch gear to intermit power transmitted to the second power transmission unit.

20. The image reading device according to claim 16, wherein the first power transmission unit includes a second one-way clutch gear mounted on the rotating shaft, the second one-way clutch gear to intermit power transmitted to the pickup roller.

21. The image reading device according to claim 19, wherein the second power transmission unit includes a cam to be rotated by power transmitted through the first one-way clutch gear, the cam to drive the lifting lever.

22. The image reading device according to claim 19, further comprising:
a supporting arm rotatably mounted to the driving shaft, and a guide arm including a first portion rotatably coupled to the supporting arm and a second portion coupled to the lifting lever to guide the lifting lever.

23. An image forming apparatus, comprising:
an image reading device including a reading unit to read image information from a document sheet and an automatic document feeder to pick up a document sheet and feed the document sheet to the reading unit, the automatic document feeder including:
a pickup device including a rotating shaft, a supporting member rotatably mounted on the rotating shaft, and a pickup roller supported by the supporting member,
a lifting lever to move the supporting member between a standby position and a pickup position, and
a pickup motor to drive the pickup roller by rotating in a first direction and to drive the lifting lever by rotating in a second direction; and
a printing device to print an image on a printing medium.

24. The image forming apparatus according to claim 23, wherein the automatic document feeder further includes an elastic member to elastically bias the supporting member in a direction of moving the supporting member towards the pickup position.

25. The image forming apparatus according to claim 23, wherein the automatic document feeder further includes a cam to be rotated by power transmitted from the pickup motor, the cam to rotate the lifting lever by interfering with a portion of the lifting lever.

26. An image reading device, comprising:
a reading unit to read information of a document sheet;
a pickup device including a pickup roller to feed the document sheet to the reading unit when the pickup device is in a pickup position;
a lifting device to move the pickup device between the pickup position and a standby position; and
a pickup driving device to drive the pickup roller by rotating in a first direction and to drive the lifting device by rotating in a second direction.

27. An image forming apparatus, comprising:
an image reading device including:
a reading unit to read information of a document sheet,
a pickup device including a pickup roller to feed the document sheet to the reading unit when the pickup device is in a pickup position,
a lifting device to move the pickup device between the pickup position and a standby position, and
a pickup driving device to drive the pickup roller by rotating in a first direction and to drive the lifting device by rotating in a second direction; and
a printing device to print an image on a printing medium.

* * * * *